United States Patent
Marappan et al.

(10) Patent No.: US 11,461,026 B2
(45) Date of Patent: Oct. 4, 2022

(54) NON-DISRUPTIVE UPDATE OF HOST MULTIPATH DEVICE DEPENDENCY

(71) Applicant: EMC IP Holding Company LLC, Hopkinton, MA (US)

(72) Inventors: Gopinath Marappan, Coimbatore (IN); Madhu Tarikere, Bangalore (IN); Ajaykumar Rajappa, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 481 days.

(21) Appl. No.: 16/747,631

(22) Filed: Jan. 21, 2020

(65) Prior Publication Data

US 2021/0223971 A1 Jul. 22, 2021

(51) Int. Cl.
G06F 3/06 (2006.01)

(52) U.S. Cl.
CPC .......... G06F 3/0635 (2013.01); G06F 3/0604 (2013.01); G06F 3/067 (2013.01); G06F 3/0632 (2013.01); G06F 3/0647 (2013.01); G06F 3/0659 (2013.01); G06F 3/0665 (2013.01)

(58) Field of Classification Search
CPC ...... G06F 3/0604; G06F 3/061; G06F 3/0632; G06F 3/0635; G06F 3/0647; G06F 3/0659; G06F 3/0665; G06F 3/067
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,467,276 B1 * | 12/2008 | Kahn | G06F 3/0632 |
| | | | 711/170 |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

Primary Examiner — Terrell S Johnson
(74) Attorney, Agent, or Firm — Ryan, Mason & Lewis, LLP

(57) ABSTRACT

A host device is configured to communicate with a storage system comprising a root logical volume. The root logical volume comprises an operating system associated with the host device. The host device is configured to obtain execution data from the root logical volume and to store the execution data in the memory of the host device. The host device is further configured to suspend the root logical volume based at least in part on the execution data stored in the memory of the host device and to change a dependency of the host device from a first multipath device of the host device to a second multipath device of the host device. The host device is further configured to reload and resume the root logical volume based at least in part on the execution data.

20 Claims, 6 Drawing Sheets

(56) References Cited

U.S. PATENT DOCUMENTS

| | | | |
|---|---|---|---|
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,127,029 | B1* | 11/2018 | Zhang ................ G06F 8/63 |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1* | 8/2008 | Salli ................ H04L 9/40 709/223 |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0084071 | A1* | 4/2012 | Cyr ................ G06F 9/45558 703/25 |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

U.S. Appl. No. 15/795,653 filed in the name of Maneesh Pusalkar et al., filed Oct. 27, 2017, and entitled "Storage System with Network-Wide Configurable Device Names."

U.S. Appl. No. 16/142,274 filed in the name of Sanjib Mallick et al., filed Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al., filed Sep. 28, 2018, and entitled "Host Device with Multi-Path Layer Implementing Path Selection Based At Least In Part on Fabric Identifiers."

U.S. Appl. No. 16/155,491 filed in the name of Kundan Kumar et al., filed Oct. 9, 2018, and entitled "Migrating Control of a Multi-Path Logical Device from a Current MPIO Driver to a Target MPIO Driver."

U.S. Appl. No. 16/155,429 filed in the name of Rimpesh Patel et al., filed Oct. 9, 2018, and entitled "Categorizing Host IO Load Pattern and Communicating Categorization to Storage System."

U.S. Appl. No. 16/697,393 filed in the name of Vinay G. Rao et al., filed Nov. 27, 2019, and entitled "Automated Seamless Migration of Logical Storage Devices."

U.S. Appl. No. 16/710,828 filed in the name of Amit PundalikAnchi et al., filed Dec. 11, 2019, and entitled "Automated Seamless Migration with Signature Issue Resolution."

* cited by examiner

```
[root@lv ~]# tool table
rhel_lv-swap: 0 10420224 linear 253:2 92200961
rhel_lv-root: 0 92135424 linear 253:2 65537
```

FIG. 6

```
[root@lv ~]# cat tool_commands
0 92135424 linear 120:0 65537
[root@lv ~]#
[root@lv ~]# /etc/opt/multipath driver/tool rhel_lv-root tool_commands
[root@lv ~]#
[root@lv ~]# tool table
rhel_lv -swap: 0 10420224 linear 120:0 92200961
rhel_lv -root: 0 92135424 linear 120:0 65537
```

FIG. 7

NON-DISRUPTIVE UPDATE OF HOST MULTIPATH DEVICE DEPENDENCY

FIELD

The field relates generally to information processing systems, and more particularly to storage in information processing systems.

BACKGROUND

Storage arrays and other types of storage systems are often shared by multiple host devices over a network. A given host device may comprise a multipath input-output (MPIO) driver that is configured to process input-output (TO) operations for delivery from the host device to the storage system. MPIO drivers often group all of the paths between a host device and a given logical volume of a storage system into a logical device, also known as a multipath device, and assign a pseudo name to the multipath device such as, e.g., deviceX. Multipath devices are utilized by the MPIO drivers of a host device to distribute input-output (TO) operations across all available paths to a given logical volume.

A host device often comes configured with a native MPIO driver, which is typically enabled by default. When a new MPIO driver is installed on the host device to replace the native MPIO driver for distributing IO operations to a given logical volume, a reboot and downtime of the host device is typically required in order to disable or deactivate the native MPIO driver and install or activate the new MPIO driver.

In some cases, a user of the host device may also wish to migrate data from a source logical volume under control of a current MPIO driver to a target logical volume under control of that current MPIO driver or another MPIO driver. However, such data migration typically requires significant and substantial application downtime, such as, e.g., outages, reconfiguration, or other similar downtime, as the data migration is performed, especially in cases where the data is being migrated between logical volumes under control of different MPIO drivers.

SUMMARY

Illustrative embodiments disclose techniques for the migration of data from a source root logical volume to a target root logical volume and functionality for changing the dependency of a root logical volume from a current MPIO driver to a target MPIO driver.

In one embodiment, an apparatus comprises a host device comprising at least one processor coupled to memory. The host device is configured to communicate over a network with a storage system comprising a root logical volume. The root logical volume comprises an operating system associated with the host device. The host device is configured to boot based at least in part on the operating system residing in the root logical volume. The host device is further configured to obtain execution data from the root logical volume and to store the execution data in the memory of the host device. The host device is further configured to suspend the root logical volume based at least in part on the execution data stored in the memory of the host device and to change a dependency of the host device from a first multipath device of the host device to a second multipath device of the host device. The host device is further configured to reload the root logical volume based at least in part on the execution data stored in the memory of the host device. The reloading comprises updating at least a portion of the root logical volume based at least in part on the change in the dependency of the host device. The host device is further configured to resume the root logical volume based at least in part on the execution data stored in the memory of the host device.

These and other illustrative embodiments include, without limitation, apparatus, systems, methods and computer program products comprising processor-readable storage media.

BRIEF DESCRIPTION OF THE DRAWINGS

FIG. 6 is an example diagram illustrating the dependency of a root logical volume to a multipath device in an illustrative embodiment.

FIG. 7 is an example diagram illustrating a change in the dependency of the root logical volume of FIG. 6 in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
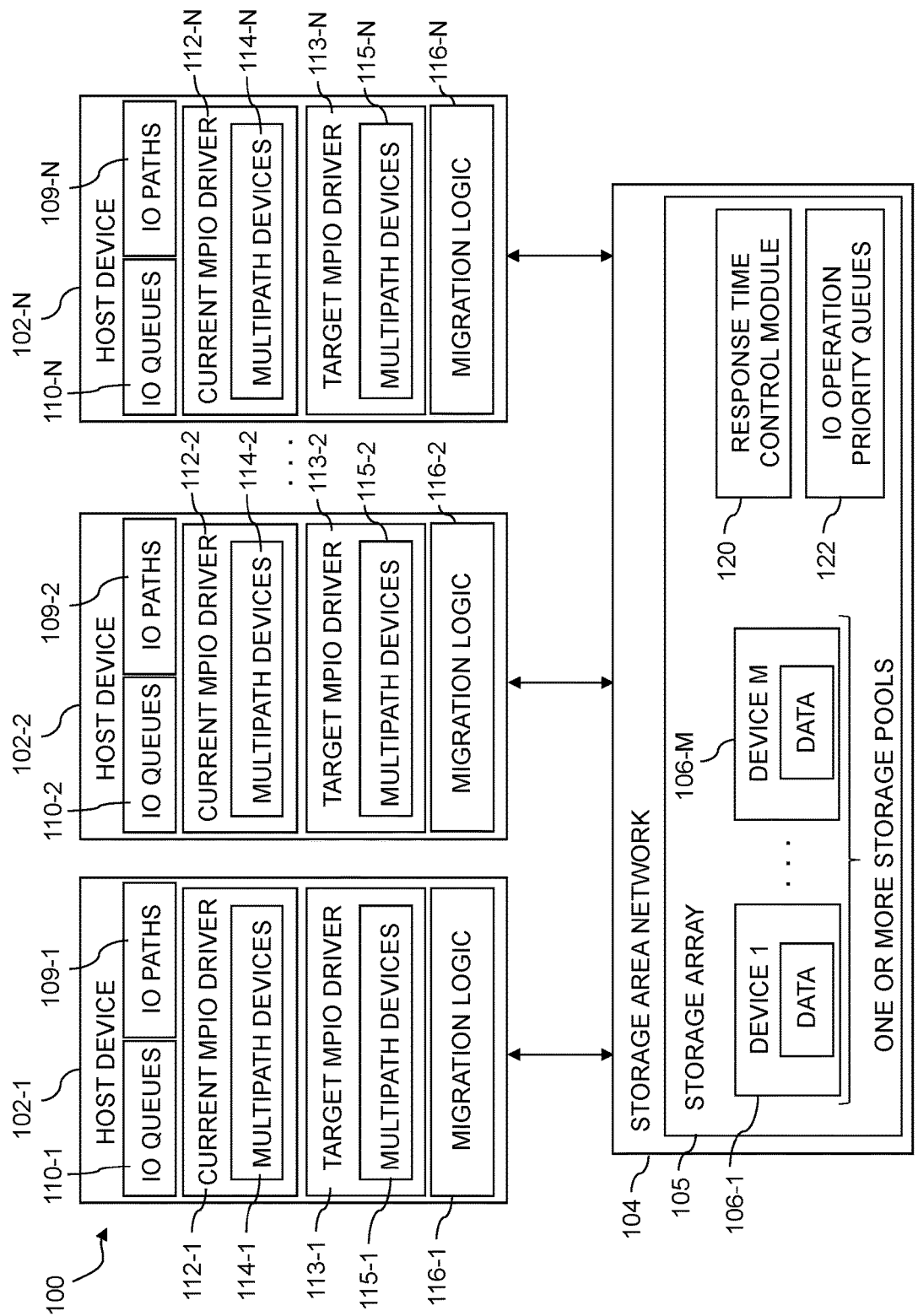
FIG. 1 is an example block diagram of an information processing system configured with functionality for the migration of data from a source root logical volume to a target root logical volume and functionality for changing the dependency of a root logical volume from a current MPIO driver to a target MPIO driver in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical storage volumes such as, e.g., logical units (LUNs), that are configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise small computer system interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO paths 109-1, 109-2, . . . , 109-N, respective sets of IO queues 110-1, 110-2, . . . 110-N, respective current MPIO drivers 112-1, 112-2, . . . 112-N, and respective target MPIO drivers 113-1, 113-2, . . . 113-N, and respective migration logic 116-1, 116-2, . . . 116-N.

As used herein, IO paths 109-1 through 109-N, refer to information about or lists of the IO pathways between a given host device 102-1 through 102-N and one or more storage arrays 105. This information may include, for example, initiator-target pairs or other similar information that may define an IO pathway between the given host device 102 and the one or more storage arrays 105. This information may be used by an MPIO driver of the given host device to transmit data to or receive data from logical volumes of the one or more storage arrays 105 using the defined IO pathway. For example, a given one of the storage devices 106 may be accessible to the given host device over multiple IO paths 109.

While each host device 102 is illustrated as having a respective target MPIO driver 113 and migration logic 116, in some embodiments such target MPIO drivers 113 and migration logic 116 may be installed on one of host devices 102 or a subset of host devices 102. For example, target MPIO drivers 113 and migration logic 116 may be installed on host devices 102 for which a user wishes to perform a data migration or MPIO driver migration.

MPIO drivers typically group all IO paths 109 from a host to a LUN or other logical storage volume into a single logical device known as a multipath device. For example, current MPIO drivers 112-1, 112-2, . . . 112-N, may have respective multipath devices 114-1, 114-2, . . . 114-N that each group at least a portion of the IO paths 109 together for the respective host device 102-1, 102-2, . . . 102-N and target MPIO drivers 113-1, 113-2, . . . 113-N, may have respective multipath devices 115-1, 115-2, . . . 115-N that each group at least a portion of the IO paths 109 together for the respective host device 102-1, 102-2, . . . 102-N. In some embodiments, each respective MPIO driver 112 or 113 may include multiple multipath devices 114 or 115, respectively. The individual block devices representing each IO path 109 are known as native devices. Applications use a multipath device for IO operations so that the IO operations may be distributed across all available IO paths 109. When IO paths fail, the MPIO driver will typically redirect the IO operations to other alive IO paths in the multipath device.

The MPIO drivers described herein may comprise, for example, otherwise conventional MPIO drivers, such as PowerPath® drivers from Dell EMC, suitably modified in the manner disclosed herein to implement functionality for the migration of data from a source root logical volume to a target root logical volume and functionality for changing the dependency of a root logical volume from a current MPIO driver to a target MPIO driver. Other types of MPIO drivers from other driver vendors may be suitably modified to incorporate functionality for the migration of data from a source root logical volume to a target root logical volume and functionality for changing the dependency of a root logical volume from a current MPIO driver to a target MPIO driver as disclosed herein.

In some embodiments, migration involves synchronizing the target logical volume to the source logical volume, i.e., achieving an operating state in which the target logical volume stores the same data as the source logical volume, and then a path flip operation is performed so that subsequent accesses of the data are directed to the target logical volume instead of the source logical volume. Once the path flip operation is successfully accomplished, the source logical volume can be taken out of service or put to some other use.

A number of data migration technologies are available to migrate data from a source logical volume to a target logical volume. One such data migration tool is Dell EMC PowerPath® Migration Enabler (PPME). PowerPath®, of which PPME is one component, is available on common operating systems such as Linux, Windows, AIX and VMware ESX. PPME uses multiple data transfer technologies for data migration including, for example, HostCopy, Open Replicator, Sym clone, SAN copy, or other similar technologies.

The multipath layer comprising MPIO drivers supports multiple IO paths 109 between each of the host devices 102 and the storage array 105. These IO paths 109 are illustratively associated with respective initiator-target pairs, with each initiator comprising a host bus adaptor (HBA) or other initiating entity of a given host device, such as the host device 102-1, and each target comprising a port or other targeted entity corresponding to one or more of the storage devices 106 of the storage array 105. As noted above, the storage devices 106 illustratively comprise LUNs or other types of logical storage volumes.

IO paths 109 may be added or deleted between the host devices 102 and the storage array 105 in the system 100. For example, the addition of one or more new IO paths 109-1 from host device 102-1 to the storage array 105 or the deletion of one or more existing IO paths 109-1 from the host device 102-1 to the storage array 105 may result from respective addition or deletion of at least a portion of the storage devices 106 of the storage array 105.

Addition or deletion of IO paths can also occur as a result of zoning and masking changes or other types of storage system reconfigurations performed by a storage administrator or other user.

In some embodiments, IO paths are added or deleted in conjunction with the addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, IO path discovery scans may be performed by the MPIO drivers of the multipath layer as needed in order to discover the addition of new IO paths or the deletion of existing IO paths.

A given IO path discovery scan can be performed utilizing known functionality of conventional MPIO drivers, such as PowerPath drivers.

The IO path discovery scan in some embodiments may be further configured to identify one or more new LUNs or other logical storage volumes associated with the one or more new IO paths identified in the path discovery scan. The IO path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new IO paths 109 identified in an IO path discovery scan of the type described above, the corresponding one of the host devices 102 is configured to execute a host registration operation for that IO path 109. The host registration operation for a given new IO path 109 illustratively provides notification to the storage array 105 that the corresponding one of the host devices 102 has discovered the new path.

The MPIO drivers utilize the multiple IO paths 109 described above to send IO operations from the host devices 102 to the storage array 105.

For example, an MPIO driver is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The current MPIO drivers 112 and target MPIO drivers 113 collectively comprise a multipath layer of the host devices 102. The migration logic 116 provides functionality for the migration of data from a source root logical volume to a target root logical volume and functionality for changing the dependency of a root logical volume from a current MPIO driver to a target MPIO driver. In some embodiments, the source root logical volume may be under control of a current MPIO driver and the target logical volume may be under control of a target MPIO driver. In some embodiments, both the source and target logical volumes may be under control of the same MPIO driver. In some embodiments, for example, host devices 102 may provide the functionality for the migration of data from a source root logical volume to a target root logical volume. In some embodiments, migration logic 116 may alternatively be included as part of a target MPIO driver 113.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which issued as U.S. Pat. No. 10,474,367 on Nov. 12, 2019, the entirety of which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers from the storage array 105.

Numerous other distributed implementations of the host devices 102 and/or the storage array 105 are possible. Accordingly, the storage array 105 can also be implemented in a distributed manner across multiple data centers.

Figure 2:
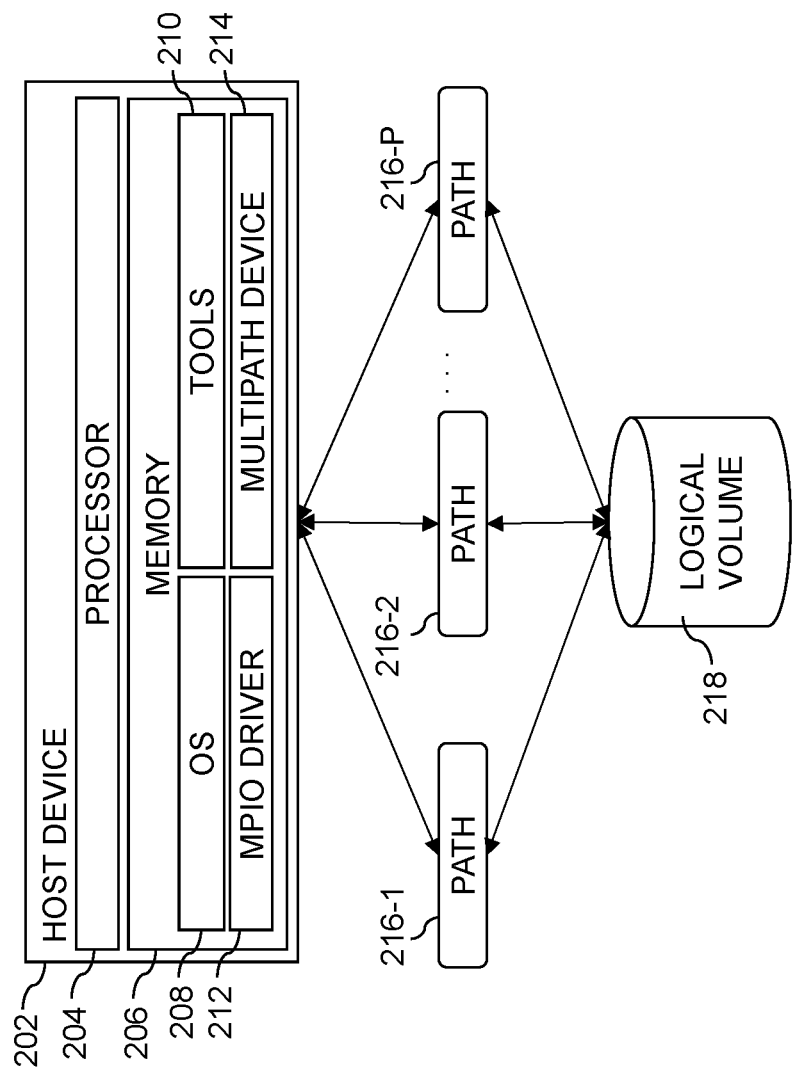
FIG. 2 is an example diagram illustrating the interaction paths between a host device and a storage array in an illustrative embodiment.

With reference now to FIG. 2, an example host device 202 of system 100, e.g., one of the host devices 102, may comprise a processing device as described above. For example, the processing device may comprise a processor 204 coupled to memory 206. Memory 206 may comprise, for example, an OS 208 for the host device 202, tools 210, an MPIO driver 212 and a multipath device 214.

OS 208 provides operating system functionality to host device 202.

Tools 210 comprise, for example, migration tools, OS commands, or other similar functionality. In some embodiments, for example, tools may comprise suspend, reload, and resume commands for the suspension, reloading and resumption of IO operations on logical volumes as part of a migration or change in dependency for that logical volume, as will be described in more detail below.

MPIO driver 212 may comprise any of MPIO drivers 112 and 113 and has similar functionality to that described above with reference to MPIO drivers 112 and 113.

Multipath device 214 comprises a set of paths 216-1, 216-2 . . . 216-P to a given logical volume 218 of the SAN 104.

Figure 3:
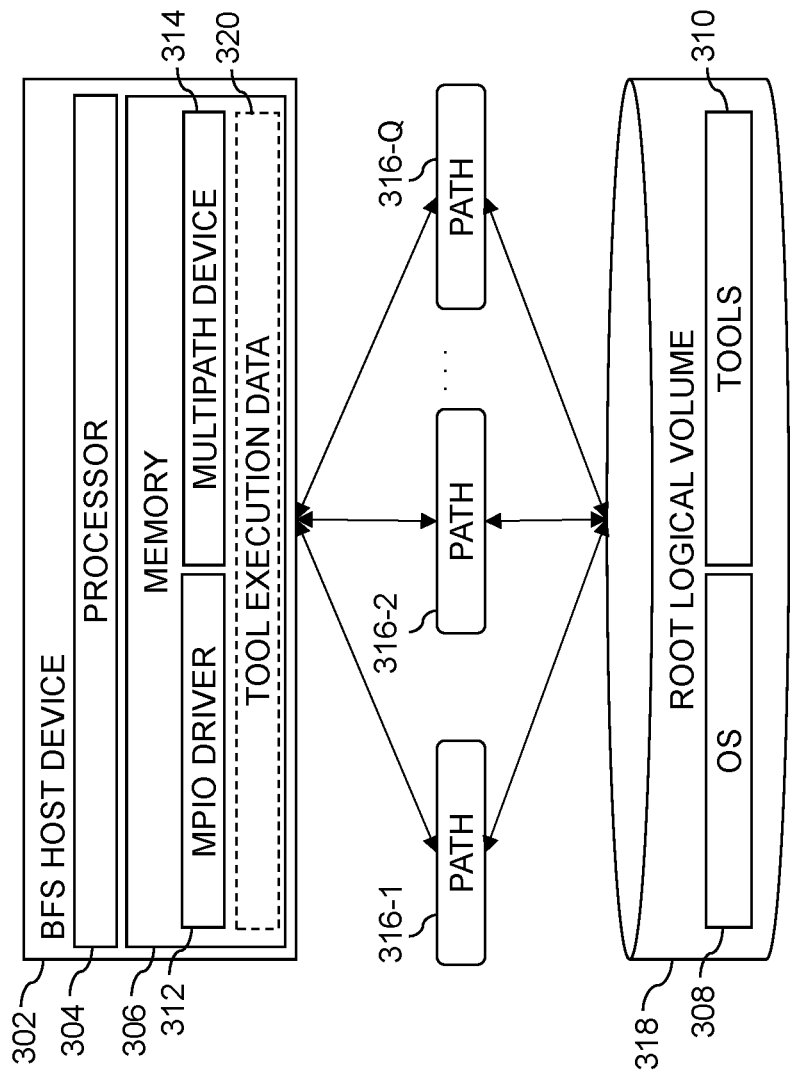
FIG. 3 is an example diagram illustrating the interaction paths between a boot from storage area network host device and a storage array in an illustrative embodiment.

With reference now to FIG. 3, an example Boot From SAN (BFS) host device 302 of system 100, e.g., one of the host devices 102, may comprise a processing device as described above. For example, the processing device may comprise a processor 304 coupled to memory 306. Memory 306 may comprise, for example, an MPIO driver 312 and a multipath device 314 similar to MPIO driver 212 and multipath device 214 as described above. In the case of the BFS host device 302, the OS 308 and tools 310 are stored in a root logical volume 318 of the SAN 104 but provide similar functionality to OS 208 and tools 210 for the BFS host device 302 except that the functionality must be called by the BFS host device 302 from the root logical volume 318.

OS 308 provides operating system functionality to BFS host device 302.

Tools 310 comprise, for example, migration tools, OS commands, or other similar functionality. In some embodiments, for example, tools may comprise suspend, reload, and resume commands for the suspension reloading and resumption of IO operations on logical volumes, as described in more detail below.

MPIO driver 312 may comprise any of MPIO drivers 112 and 113 and has similar functionality to that described above with reference to MPIO drivers 112 and 113.

Multipath device 314 comprises a set of paths 316-1, 316-2 . . . 316-Q to the root logical volume 318.

A user typically utilizes an MPIO driver for the IO load balancing or other multipathing needs associated with executing an application on a storage system. In some scenarios, a user may wish to upgrade or replace the storage devices on which the application data is stored or to otherwise transfer the application data between storage devices. In such a scenario, the user may find it difficult to migrate the data without significantly impacting the performance of the application and in some cases may even need to temporarily stop execution of the application and perform multiple system reconfigurations to migrate the data from one or more source logical volumes to one or more target logical volumes. For example, a data migration tool may be utilized to migrate the data from the source logical volumes to the target logical volumes which may or may not be under control of the MPIO driver.

The OS 208 of a given host device 202 may provide functionality, such as, e.g., tools 210, for changing the dependency of logical volumes from one multipath device to another. For example, the Linux OS provides a tool 210 called dmsetup for changing the dependency of logical volumes from one multipath device to another by executing the following distinct commands on the root logical volume:
  1. dmsetup suspend
  2. dmsetup reload
  3. dmsetup resume Other OSs 208 may utilize other tools 210 or commands for changing the dependencies of logical volumes from one multipath device to another. Regardless of the tool 210, the first command that is executed typically suspends the logical volume for which the dependency is being changed.

In the case of a BFS host device 302, however, such a data migration or change in dependency using tools 310, which reside on the root logical volume 318 instead of on the BFS host device 302, may involve additional considerations. A BFS host device 302 relies on a root logical volume 318 which comprises the root filesystem of the OS 308 for that BFS host device 302. When a data migration or change in dependency involving that root logical volume 318 occurs, a reboot and downtime of the BFS host device 302 is often required because the root filesystem located on that root logical volume 318, including the OS 308 and tools 310 for that BFS host device 302, is needed for the BFS host device 302 to function and perform the migration. Also, if a target MPIO driver 113 (FIG. 1) is installed on the BFS host device 302 to replace a current MPIO driver 112 (FIG. 1) for distributing IO operations for the application running on the BFS host device 302, a reboot and downtime of the BFS host device 302 is typically required in order to disable or deactivate the current MPIO driver 112 and install or activate the target MPIO driver 113. The reboot and downtime are typically required because the root filesystem, OS 308 and tools 310 are all located on the root logical volume 318 and the dependency of the root logical volume 318 from the current MPIO driver 112 to the target MPIO driver 113, e.g., by swapping the pseudo names of their respective multipath devices 114 and 115 for the root logical volume 318, typically cannot be changed without downtime and reconfiguration using existing tools or methods.

For example, on a BFS host device 302, where the OS 308 is stored in the root logical volume 318, the dependency of the root logical volume 318 will be on a multipath device 314 provided by the MPIO driver 312. In such a BFS host device 302, the functionality for changing the dependencies of logical volumes, such as the tools 310 mentioned above, also resides in the root logical volume 318 and is executed by the BFS host device 302 on the root logical volume 318 by submitting a call to one or more of the tools 310, e.g., suspend, reload and resume commands, on the root logical volume 318 via the multipath device 314, e.g., as a read IO operation. The call to the suspend command may indicate that the root logical volume 318 is to be suspended, e.g., inhibited from receiving or sending IO operations. The call to the reload command may indicate that the root logical volume 318 is to be reloaded, e.g., updating the mapping table. The call to the resume command may indicate that the root logical volume 318 is to be resumed, e.g., resuming IO operations for the root logical volume 318. The execution of a given one of the commands in response to the call by the BFS host device 302 typically implements the corresponding action on a logical volume indicated by the command.

However, the functionality of tool 310 such as, e.g., the dmsetup tool, or other similar tools, cannot be utilized to change the dependency of the root logical volume 318 since the first command executed on the root logical volume 318 by the BFS host device 302 is typically the suspend command, e.g., dmsetup suspend. Once the suspend command is executed by the BFS host device 302 on the root logical volume 318, the root logical volume 318 becomes suspended and is no longer receiving IO operations. Since the root logical volume 318 no longer receives IO operations while suspended, the calls by the BFS host device 302 to any other tools 310, e.g., the reload and resume commands, will fail or otherwise timeout since these calls are performed as IO operations and IO operations to the root logical volume 318 have already been suspended by the call to the suspend command. Therefore, these commands will not be executed on the root logical volume 318 and the root logical volume 318 will not be reloaded and resumed without a reboot or shutdown of the BFS host device 302 or the root logical volume 318.

With reference to FIGS. 1 and 3, the disclosed migration logic 116 is configured to migrate data from a source root logical volume to a target root logical volume or change the dependency of a root logical volume 318 for an application from a source multipath device 114 of a current MPIO driver 112 to a target multipath device 115 of a target MPIO driver 113 in a manner that mitigates the need for application downtime to reconfigure a BFS host device 302 and in some embodiments has no application downtime to reconfigure a BFS host device 302.

As mentioned above, MPIO drivers group the paths from a host device to a logical volume together as a multipath device and assign the device a pseudo name such as, e.g., deviceX. The multipath device is then utilized by the multipath driver to submit IO operations to the storage array for that logical volume. A migration of data from a source logical volume to a target logical volume, both of which are under control of the same MPIO driver, may comprise the performance of a number of steps.

As an example, initially the MPIO driver or a migration tool may initiate the migration from the source logical volume to the target logical volume by identifying the pseudo names for the multipath devices that are utilized to service each of the source and target logical volumes. For the purposes of this example, the multipath device containing the paths for the source logical volume may have the pseudo name "deviceA" and the multipath device containing the paths for the target logical volume may have the pseudo name "deviceB".

Next, the MPIO driver or the migration tool may synchronize the data between the source and target logical volumes, for example, by copying the data from the source logical volume to the target logical volume, e.g., block by block or in any other manner, and cloning any application write IO operations to both the source logical volume and the target logical volume. At this point, read IO operations are still performed utilizing only the source logical volume.

Once the data has been synchronized between the source and target logical volumes, the migration state for the data migration is in a source selected state, or may be may be changed by the MPIO driver or the migration tool to the source selected state if it is not already set, with all application write IO operations cloned to both the source and target logical volumes and any read IO operations still performed utilizing only the source logical volume.

The migration state is then changed by the MPIO driver or the migration tool to a target selected state where all application write IO operations are cloned to both the source and target logical volumes but read IO operations are now performed utilizing the target logical volume.

The MPIO driver or migration tool then commits the migration, for example, by suspending the source and target logical volumes temporarily, changing the pseudo names of the multipath devices for the source and target logical volumes, updating the mapping database, resuming the source and target logical volumes and updating the partition tables on both source and target devices. For example, the pseudo name for the multipath device containing the paths to the target logical volume, e.g., "deviceB", may be replaced with the pseudo name for the multipath device containing the paths to the source logical volume, e.g., "deviceA", and the pseudo name of the multipath device for the source logical volume may be changed to another pseudo name, e.g., "deviceC", or the original pseudo name of the multipath device containing the paths to the target logical volume, e.g., "deviceB". In this manner the application may still rely on the same pseudo name, e.g., "deviceA", to service the IO operations for the application even though the multipath device having the pseudo name "deviceA" now includes the paths to the target logical volume instead of the source logical volume.

The migration may be cleaned up by clearing the source logical volume of all data, e.g., by zeroing out the source logical volume.

When a migration such as that described above is utilized to migrate a root logical volume 318 of a BFS host device 302, however, the migration may fail to complete. This is because during the commit portion of the migration, the suspension of the root logical volume 318 also inhibits the calls to any additional tools 310 on the root logical volume 318 by the BFS host device 302. While the pseudo names of the multipath devices 314 on the BFS host device 302 may still be changed, e.g., swapped between the root logical volume 318 and a target root logical volume, as described above, the reload command for updating the mapping database on the root logical volume 318 with these pseudo name changes cannot be called by the BFS host device 302 since the call to the reload command is an IO operation and the root logical volume 318 is suspended from receiving IO operations. The reload command therefore cannot be executed on the root logical volume 318 to update the mapping table. In addition, the resume command also cannot be called by the BFS host device 302 since the call to the resume command is also an IO operation and the root logical volume 318 is suspended from receiving IO operations. The resume command therefore cannot be executed on the root logical volume 318 to resume IO operations. This may cause the commit operation for migration of the root logical volume 318 to timeout or otherwise fail which may cause the data migration as a whole to fail.

This issue also occurs when attempting to change the dependency of the root logical volume 318 from a source multipath device 114 of a current MPIO driver 112 to a target multipath device 115 of a target MPIO driver 113. For example, since the root logical volume 318 is suspended as part of the change of dependency, the reload command cannot be called by the BFS host device 302 since the call to the reload command is an IO operation and the root logical volume 318 is suspended from receiving IO operations. The reload command therefore cannot be executed on the root logical volume 318 to update the mapping table stored on the root logical volume 318 to reflect the change in dependency from the source multipath device 114 to the target multipath device 115. The root logical volume 318 also cannot be resumed by a call to the resume command for similar reasons.

The disclosed migration logic 116 comprises functionality for changing the dependency of the root logical volume 318 a BFS host device 302 from a source multipath device 114 of a current MPIO driver 112 to a target multipath device 115 of a target MPIO driver 113 with little or no downtime of the BFS host device 302. In addition, the disclosed migration logic 116 also comprises functionality for migrating the dependency of a BFS host device 302 from a source root logical volume to a target root logical volume during a data migration with little or no downtime of the BFS host device 302.

The migration logic 116 overcomes the issues described above by obtaining tool execution data 320, e.g., machine code or other code, corresponding to the tools 310 from the root logical volume 318 in one or more calls prior to execution of the suspend command on the root logical volume 318. For example, one or more IO operations comprising calls to the root logical volume 318 may be used to obtain the tool execution data 320 for all three commands prior to execution of the suspend command on the root logical volume 318. These calls to obtain the tool execution data 320 may be used instead of the separate IO operations to call and execute the suspend, reload and resume commands separately on the root logical volume 318, as described above. The tool execution data 320 for the commands may then be stored locally on the BFS host device 302, for example, as shown in FIG. 3, and executed from the BFS host device 302 without requiring the submission of further IO operations to the root logical volume 318 to call the commands. In this manner, the execution of the suspend command on the root logical volume 318 by the BFS host device 302 may be triggered by the locally stored tool execution data 320 for the suspend command to suspend IO operations to the root logical volume 318. Likewise, the execution of the reload command on the root logical volume 318 by the BFS host device 302 may also be triggered by the locally stored tool execution data 320 for the reload command to update the mapping table on the root logical volume 318 without requiring the use of an IO operation to call the reload command on the root logical volume 318, which would have failed since such IO operations were suspended by the suspend command. The execution of the resume command on the root logical volume 318 by the BFS host device 302 may also be triggered by the locally stored tool execution data 320 for the resume command to resume the IO operations to the root logical volume 318. The commit portion of the migration may then be completed as normal.

The use of migration logic 116 allows the BFS host device 302 to obtain and rely on locally stored tool execution data 320 instead of using IO operations to call the tools 310 on the root logical volume 318 after the root logical volume 318 has been suspended by the suspend command. In this manner, the suspension of IO operations to the root logical volume 318 of a BFS host device 302 by the suspend command is inhibited from impacting the remainder of the commit portion of the migration or change in dependency of that root logical volume 318, e.g., the reload and resume commands.

This functionality may be utilized to migrate a root logical volume 318 or change the dependency of the root logical volume 318 from one multipath device 314 to another because no further read IO operations are required from the root logical volume 318 by the BFS host device 302 when executing the reload and resume commands after the root logical volume 318 has been suspended by the suspend command of the tools 310.

Figure 4:
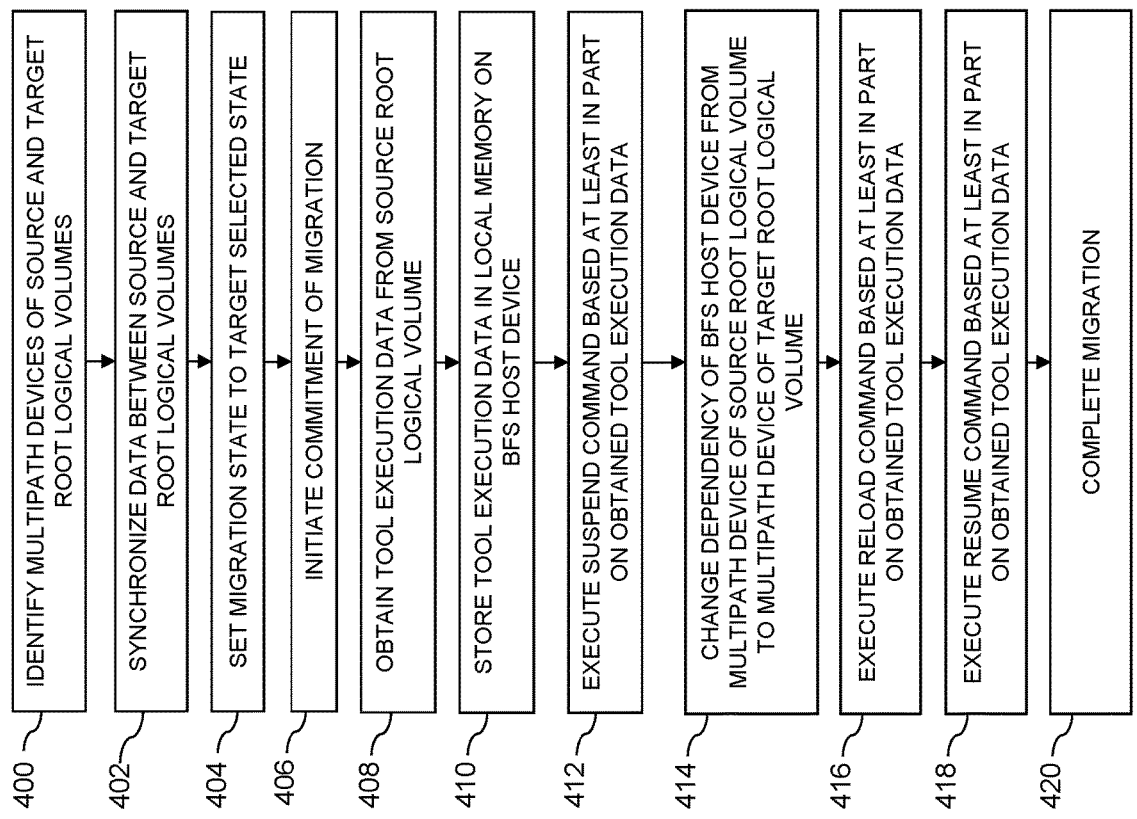
FIG. 4 is a flow diagram of an example process for the migration of data from a source root logical volume to a target root logical volume in an illustrative embodiment.

FIG. 4 illustrates an example process implemented by migration logic 116 for migrating data from a source root logical volume, e.g., root logical volume 318, of a BFS host device, e.g., BFS host device 302, to a target root logical volume. The process of FIG. 4 will be described with reference also to FIGS. 1 and 3.

The process as shown in FIG. 4 includes steps 400 through 420, and is suitable for use in the system 100 but is more generally applicable to other types of systems comprising multiple host devices and a shared storage system.

At step 400, the migration logic 116 initiates the migration from the source root logical volume to the target root logical volume and identifies the pseudo names for the multipath devices that are utilized to service each of the source and target root logical volumes. For the purposes of this example, the multipath device comprising the paths for the source root logical volume may have the pseudo name "deviceA" and the multipath device comprising the paths for the target root logical volume may have the pseudo name "deviceB". As part of the initialization, migration logic 116 may also specify that the migration is a migration of a root logical volume for the BFS host device. In some embodiments, migration logic 116 may determine that the source logical volume is a root logical volume and enable the root logical volume migration functionality of migration logic 116 as described herein.

At step 402, the migration logic 116 synchronizes the data between the source and target root logical volumes, for example, by copying the data from the source root logical volume to the target root logical volume, e.g., block by block or in any other manner, and cloning any application write IO operations to both the source root logical volume and the target root logical volume. At this point, read IO operations are still performed utilizing only the source root logical volume.

Once the data has been synchronized between the source and target root logical volumes, the migration state for the data migration is considered to be in a source selected state. Alternatively, the migration state may be changed by the migration logic 116 to the source selected state if it is not already set to the source selected state. In the source selected state, all application write IO operations are cloned to both the source and target root logical volumes and any read IO operations are still performed utilizing only the source logical volume.

At step 404, migration logic 116 changes the migration state to a target selected state where all application write IO operations are cloned to both the source and target root logical volumes but read IO operations are now performed utilizing the target root logical volume.

At step 406, the migration logic 116 initiates commitment of the migration. In some cases, during initiation of the commitment of the migration, migration logic 116 may determine that the commitment involves a root logical volume, for example, based at least in part on a selection of a root logical volume migration by migration logic 116 in step 400. In such a case, migration logic 116 may employ the functionality of steps 408 through 418 below to commit the migration of the root logical volume.

At step 408, migration logic 116 obtains the tool execution data 320, e.g., machine code, for the tools 310 of the OS 308 residing on the source root logical volume, e.g., root logical volume 318, from the source root logical volume. For example, the tool execution data 320 may comprise machine code for executing the suspend, reload and resume commands without calling the commands on the source root logical volume.

At step 410, migration logic 116 stores the obtained tool execution data locally, e.g., in memory on the BFS host device.

At step 412, migration logic 116 executes the suspend command on the source root logical volume based at least in part on the obtained tool execution data to suspend IO operations for the source root logical volume. Migration logic 116 may also execute the suspend command on the target root logical volume.

At step 414, migration logic 116 changes the dependency of the BFS host device 302 from the multipath device, e.g., "deviceA", comprising paths to the source root logical volume to the multipath device, e.g., "deviceB", comprising paths to the target root logical volume. Note that for a change in dependency of the BFS host device from a source root logical volume to a target root logical volume there is no need to swap the multipath device pseudo names since the BFS host device will boot from the target root logical volume in the future. For example, in the case of an LVM based system, only the boot partition configuration file may need to be updated to reflect the location of the boot OS.

At step 416, migration logic 116 executes the reload command on the source and target root logical volumes based at least in part on the obtained tool execution data to update the mapping tables to reflect the change in dependency of the BFS host device from the multipath device comprising the paths to the source root logical volume to the multipath device comprising the paths to the target root logical volume.

At step 418, migration logic 116 executes the resume command on the source and target root logical volumes based at least in part on the obtained tool execution data to resume IO operations on the source and target root logical volumes. The migration has now been committed and the dependency of the BFS host device has been transferred to the target root logical volume. For example, the BFS host device now uses the OS of the target root logical volume for its OS-based functionality.

At step 420, migration logic 116 completes the migration, for example, by clearing the source root logical volume of all data, e.g., by zeroing out the source root logical volume.

Utilizing the process of FIG. 4, the migration logic 116 can migrate a source root logical volume of a BFS host device to a target root logical volume and change the dependency of the BFS host device from the source root logical volume to the target root logical volume as part of the migration without incurring substantial downtime of the BFS host device or in some embodiments while incurring little to no downtime of the BFS host device.

Figure 5:
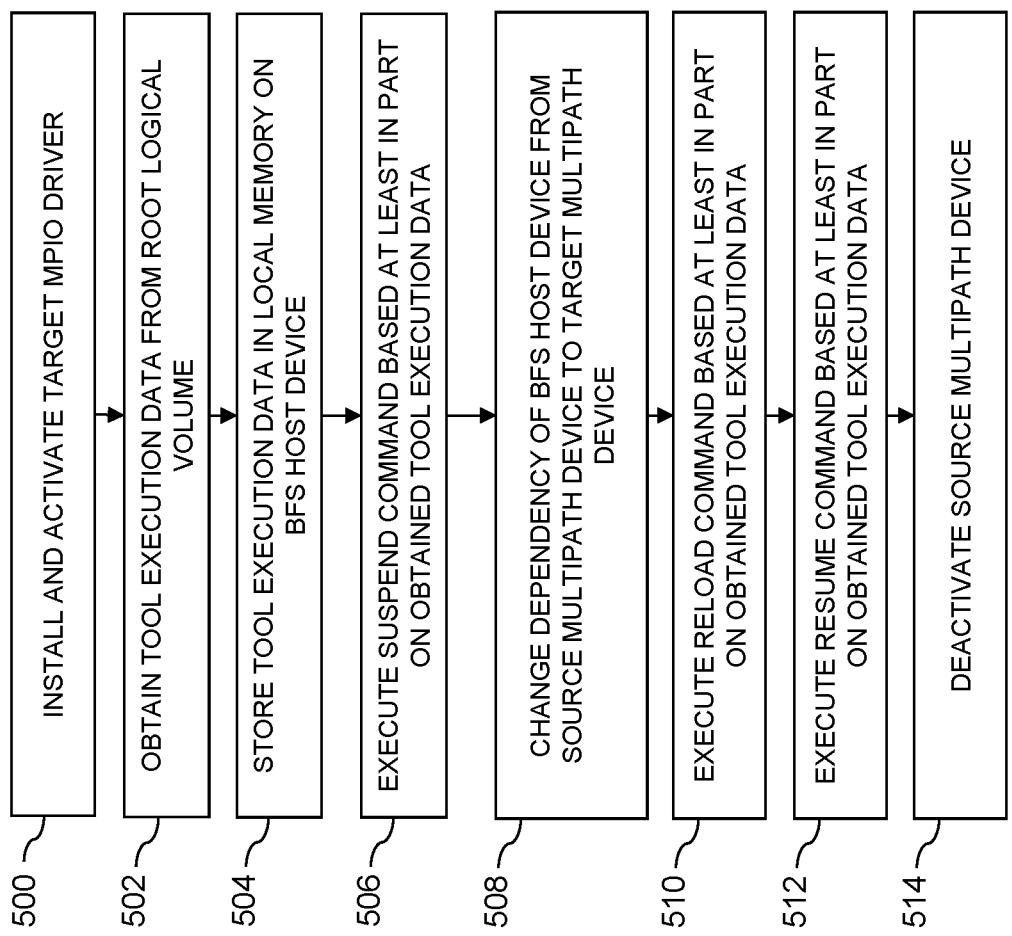
FIG. 5 is a flow diagram of an example process for changing the dependency of a root logical volume from a current MPIO driver to a target MPIO driver in an illustrative embodiment.

FIG. 5 illustrates an example process implemented by migration logic 116 for changing a dependency of a BFS host device from a source multipath device of a current MPIO driver to a target multipath device of a target MPIO driver, with reference also to FIGS. 1 and 3. In this example, the source multipath device may comprise one of the multipath devices 114 of current MPIO driver 112-1 and the target multipath device may comprise one of the multipath devices 115 of the target MPIO driver 113-1. The source and target multipath devices both comprise paths to the same logical volume, in this case the root logical volume 318 for the BFS host device 302. For the purposes of this example process, the source multipath device may have a pseudo name of "deviceX" and the target multipath device may have a pseudo name of "deviceY".

The process as shown in FIG. 5 includes steps 500 through 514, and is suitable for use in the system 100 but is more generally applicable to other types of systems comprising multiple host devices and a shared storage system.

Initially, the current MPIO driver is active and managing the root logical volume of the BFS host device. An example 600 of the dependency of the root logical volume to the source multipath device of the current MPIO driver is shown in FIG. 6 where, for example, the source multipath device with major:minor 253:2 is assigned the pseudo name "deviceX" by the current MPIO driver and the root logical volume has a dependency to the source multipath device having the pseudo name "deviceX".

At step 500, migration logic 116 installs the target MPIO driver on the BFS host device and activates its functionality. The target MPIO driver generates a target multipath device, e.g., "deviceY" for the root logical volume of the BFS host device. The target MPIO driver also manages the root logical volume, although initially no IO operations that are submitted by the BFS host device to the root logical volume will flow through the target multipath device of the target MPIO driver. In some embodiments, the target MPIO driver may already be installed on the BFS host device and migration logic 116 may activate or otherwise cause the target MPIO driver to generate the target multipath device for the root logical volume of the BFS host device.

At step 502, migration logic 116 obtains the tool execution data 320, e.g., machine code, for the tools 310 of the OS 308 residing on the root logical volume from the root logical volume, e.g., via the source multipath device. For example, the tool execution data 320 may comprise machine code for executing the suspend, reload and resume commands without calling the commands on the root logical volume.

At step 504, migration logic 116 stores the obtained tool execution data locally, e.g., in memory on the BFS host device.

At step 506, migration logic 116 executes the suspend command on the root logical volume based at least in part on the obtained tool execution data 320 to suspend IO operations for the root logical volume.

At step 508, migration logic 116 changes the dependency of the BFS host device 302 for the root logical volume from the source multipath device, e.g., "deviceX" to the target multipath device, e.g., "deviceY".

At step 510, migration logic 116 executes the reload command on the root logical volume based at least in part on the obtained tool execution data to update the mapping tables of the root logical volume to reflect the change in dependency of the root logical volume from the source multipath device to the target multipath device.

At step 512, migration logic 116 executes the resume command on the root logical volume based at least in part on the obtained tool execution data to resume IO operations on the root logical volume. The migration has now been committed and the dependency of the BFS host device for the root logical volume has been transferred to the source multipath device of the current MPIO driver to the target multipath device of the target MPIO driver. For example, the BFS host device now accesses the OS of the root logical volume and submits IO operations to the root logical volume via the target multipath device.

With reference now to FIG. 7, an example 700 of at least part of the process of FIG. 5 is illustrated. The multipath device with the major:minor 120:0 is assigned a pseudo name of "deviceY" by the target MPIO driver and the machine code for the tool_commands is obtained from the root logical volume and stored by the BFS host device in local memory. The host device then executes the tool_commands based on the stored machine code. After the dependency of the root logical volume is changed from "deviceX" to "deviceY", the dependency of the root logical volume is now on the target multipath device having the pseudo name "deviceY". From now on, the submission of IO operations to the root logical volume is managed by the target multipath device having the pseudo name "deviceY" under control of the target MPIO driver.

At step 514, the source multipath device and current multipath driver are deactivated with respect to the root logical volume. Either or both of the source multipath device and current multipath driver may also be removed if desired.

In this manner, the dependency of a root logical volume of a BFS host device may be changed from a source multipath device to a target multipath device without incurring substantial downtime and in some embodiments little to no downtime. This process allows the BFS host device to switch MPIO drivers even for those multipath devices which comprise paths to the BFS host device's root logical volume without requiring downtime associated with a reboot or reconfiguration of the BFS host device.

Separate instances of the processes of FIGS. 4 and 5 may be performed in respective additional host devices that share the storage array.

The particular processing operations and other system functionality described in conjunction with the flow diagrams of FIGS. 4 and 5 are presented by way of illustrative example only, and should not be construed as limiting the scope of the disclosure in any way. Alternative embodiments can use other types of processing operations involving host devices, storage systems and migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different migration logic arrangements within a given information processing system.

Functionality such as that described in conjunction with the flow diagrams of FIGS. 4 and 5 can be implemented at least in part in the form of one or more software programs stored in memory and executed by a processor of a processing device, such as a computer or server. As will be described herein, a memory or other storage device having executable program code of one or more software programs embodied therein is an example of what is more generally referred to herein as a "processor-readable storage medium."

Numerous alternative arrangements of these and other features can be used in implementing the processes of FIGS. 4 and 5 in other illustrative embodiments.

The illustrative embodiments disclosed herein can provide a number of significant advantages relative to conventional arrangements. For example, disclosed migration logic 116 provides functionality which allows the root logical volume of a BFS host device to be migrated during a data migration without incurring substantial downtime in the BFS host device due to its reliance on the root logical volume for its OS functionality. In addition, the disclosed migration logic 116 also provides functionality which allows the dependency of the root logical volume of a BFS host device to be transferred from the multipath device of a current MPIO driver to the multipath device of a target MPIO driver without substantial interruption of the functionality of the BFS host device.

The above-described functions associated with functionality for the migration of data from a source root logical volume to a target root logical volume and functionality for changing the dependency of a root logical volume from a current MPIO driver to a target MPIO driver are carried out at least in part under the control of its migration logic 116. For example, migration logic 116 is illustratively configured to control performance of portions of the process shown in the flow diagrams described above in conjunction with FIGS. 4 and 5.

It is assumed that each of the other MPIO drivers 112 and 113 are configured in a manner similar to that described above and elsewhere herein for the first current MPIO driver 112-1 and first target MPIO driver 113-1. The other host devices 102 of the system 100 are therefore also configured to communicate over the SAN 104 with the storage array 105 and the MPIO drivers 112 and 113 of such other host devices are each similarly configured to select IO operations from its corresponding one of the sets of IO queues 110 for delivery to the storage array 105 over the SAN 104, and to perform the disclosed functionality for the migration of data from a source root logical volume to a target root logical volume and functionality for changing the dependency of a root logical volume from a current MPIO driver to a target MPIO driver. Accordingly, functionality described above in the context of the first MPIO drivers 112-1 and 113-1 is assumed to be similarly performed by each of the other MPIO drivers 112-2 and 113-2 through 112-N and 113-N for the migration of data from a source root logical volume to a target root logical volume and functionality for changing the dependency of a root logical volume from a current MPIO driver to a target MPIO driver.

The MPIO drivers 112 and 113 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support the migration of data from a source root logical volume to a target root logical volume and functionality for changing the dependency of a root logical volume from a current MPIO driver to a target MPIO driver.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for the migration of data from a source root logical volume to a target root logical volume and functionality for changing the dependency of a root logical volume from a current MPIO driver to a target MPIO driver as disclosed herein, many storage systems will require substantial or significant application or BFS host device downtime to migrate data from a source root logical volume to a target root logical volume or change the dependency of a root logical volume from a current MPIO driver to a target MPIO driver. This leads to inefficiencies in the storage system as well as in the host devices that share that storage system.

Such drawbacks are advantageously overcome in illustrative embodiments herein by utilization of migration logic 116 to implement functionality for the migration of data from a source root logical volume to a target root logical volume and functionality for changing the dependency of a root logical volume from a current MPIO driver to a target MPIO driver as described above. For example, by obtaining the tool execution data from the root logical volume and storing the tool execution data locally prior to executing the suspend, reload and resume commands on the root logical volume, the migration of the root logical volume or change in dependency of the root logical volume may be performed without requiring separate calls for the reload and resume commands to the root logical volume while the root logical volume is suspended by the suspend command.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and 113 and migration logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the migration logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, migration logic and additional or alternative components. Also, the particular configurations of system and device elements and associated processing operations illustratively shown in the drawings can be varied in other embodiments. For example, a wide variety of different MPIO driver configurations and associated MPIO migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising at least one processor coupled to memory, the host device configured to communicate over a network with a storage system comprising a root logical volume, the root logical volume comprising an operating system associated with the host device, the host device being configured to boot based at least in part on the operating system residing in the root logical volume;
wherein the host device is further configured:
to obtain execution data from the root logical volume;
to store the execution data in the memory of the host device;
to suspend the root logical volume based at least in part on the execution data stored in the memory of the host device;
to change a dependency of the host device from a first multipath device of the host device to a second multipath device of the host device;
to reload the root logical volume based at least in part on the execution data stored in the memory of the host device, the reloading comprising updating at least a portion of the root logical volume based at least in part on the change in the dependency of the host device; and
to resume the root logical volume based at least in part on the execution data stored in the memory of the host device.

2. The apparatus of claim 1 wherein the first multipath device comprises a first plurality of paths to the root logical volume and the second multipath device comprises a second plurality of paths to the root logical volume.

3. The apparatus of claim 2 wherein the host device comprises a first multipath driver and a second multipath driver, the first multipath driver comprising the first multipath device and the second multipath driver comprising the second multipath device;
wherein changing the dependency of the host device comprises changing the dependency of the host device from the first multipath driver to the second multipath driver; and
wherein the host device is configured to submit IO operations to the root logical volume using the first multipath driver via the first multipath device prior to the change in dependency of the host device and to submit IO operations to the root logical volume using the second multipath driver via the second multipath device after the change in dependency.

4. The apparatus of claim 1 wherein the first multipath device comprises a first plurality of paths to the root logical volume and the second multipath device comprises a second plurality of paths to a target root logical volume.

5. The apparatus of claim 4 wherein the host device is further configured to migrate data of the root logical volume to the target root logical volume.

6. The apparatus of claim 4 wherein changing the dependency of the host device from the first multipath device to the second multipath device comprises changing the dependency of the host device from the root logical volume to the target root logical volume; and
wherein the host device is configured to submit IO operations to the root logical volume using the first multipath device prior to the change in dependency of the host device and to submit IO operations to the target root logical volume using the second multipath device after the change in dependency of the host device.

7. The apparatus of claim 1 wherein the execution data comprises machine code for executing at least one operating system command of the operating system residing in the root logical volume.

8. The apparatus of claim 7 wherein the at least one operating system command comprises two or more of a suspend command, a reload command and a resume command;
wherein suspending the root logical volume based at least in part on the execution data stored in the memory of the host device comprises executing the suspend command on the root logical volume based at least in part on the machine code for the suspend command stored in the memory of the host device; and
wherein at least one of reloading the root logical volume and resuming the root logical volume comprises executing the respective reload or resume command on the root logical volume based at least in part on the machine code for the respective reload or resume command stored in the memory of the host device while the root logical volume is suspended due to the execution of the suspend command.

9. A method comprising:
obtaining, by a host device, execution data from a root logical volume stored on a storage system, the host device comprising at least one processor coupled to memory and configured to communicate over a network with the storage system, the root logical volume comprising an operating system associated with the host device, the host device being configured to boot based at least in part on the operating system residing in the root logical volume;
storing, by the host device, the execution data in the memory of the host device;
suspending, by the host device, the root logical volume based at least in part on the execution data stored in the memory of the host device;
changing, by the host device, a dependency of the host device from a first multipath device of the host device to a second multipath device of the host device;
reloading, by the host device, the root logical volume based at least in part on the execution data stored in the memory of the host device, the reloading comprising updating at least a portion of the root logical volume based at least in part on the change in the dependency of the host device; and
resuming, by the host device, the root logical volume based at least in part on the execution data stored in the memory of the host device.

10. The method of claim 9 wherein the first multipath device comprises a first plurality of paths to the root logical volume and the second multipath device comprises a second plurality of paths to the root logical volume.

11. The method of claim 10 wherein the host device comprises a first multipath driver and a second multipath driver, the first multipath driver comprising the first multipath device and the second multipath driver comprising the second multipath device;
wherein changing the dependency of the host device comprises changing the dependency of the host device from the first multipath driver to the second multipath driver; and
wherein the host device is configured to submit IO operations to the root logical volume using the first multipath driver via the first multipath device prior to the change in dependency of the host device and to submit IO operations to the root logical volume using the second multipath driver via the second multipath device after the change in dependency.

12. The method of claim 9 wherein the first multipath device comprises a first plurality of paths to the root logical volume and the second multipath device comprises a second plurality of paths to a target root logical volume.

13. The method of claim 12 wherein method further comprises migrating data of the root logical volume to the target root logical volume.

14. The method of claim 12 wherein changing the dependency of the host device from the first multipath device to the second multipath device comprises changing the dependency of the host device from the root logical volume to the target root logical volume; and
wherein the host device is configured to submit IO operations to the root logical volume using the first multipath device prior to the change in dependency of the host device and to submit IO operations to the target root logical volume using the second multipath device after the change in dependency of the host device.

15. The method of claim 9 wherein the execution data comprises machine code for executing at least one operating system command of the operating system residing in the root logical volume.

16. The method of claim 15 wherein the at least one operating system command comprises two or more of a suspend command, a reload command and a resume command;
wherein suspending the root logical volume based at least in part on the execution data stored in the memory of the host device comprises executing the suspend command on the root logical volume based at least in part on the machine code for the suspend command stored in the memory of the host device; and
wherein at least one of reloading the root logical volume and resuming the root logical volume comprises executing the respective reload or resume command on the root logical volume based at least in part on the machine code for the respective reload or resume command stored in the memory of the host device while the root logical volume is suspended due to the execution of the suspend command.

17. A computer program product comprising a non-transitory processor-readable storage medium having stored therein program code of one or more software programs, wherein the program code, when executed by a host device comprising at least one processor coupled to memory, the host device configured to communicate over a network with a storage system comprising a root logical volume, the root logical volume comprising an operating system associated with the host device, the host device being configured to boot based at least in part on the operating system residing in the root logical volume, causes the host device:
to obtain execution data from the root logical volume;
to store the execution data in the memory of the host device;
to suspend the root logical volume based at least in part on the execution data stored in the memory of the host device;
to change a dependency of the host device from a first multipath device of the host device to a second multipath device of the host device;
to reload the root logical volume based at least in part on the execution data stored in the memory of the host device, the reloading comprising updating at least a portion of the root logical volume based at least in part on the change in the dependency of the host device; and
to resume the root logical volume based at least in part on the execution data stored in the memory of the host device.

18. The computer program product of claim 17 wherein the first multipath device comprises a first plurality of paths to the root logical volume and the second multipath device comprises a second plurality of paths to the root logical volume;
wherein the host device comprises a first multipath driver and a second multipath driver, the first multipath driver comprising the first multipath device and the second multipath driver comprising the second multipath device;
wherein changing the dependency of the host device comprises changing the dependency of the host device from the first multipath driver to the second multipath driver; and
wherein the host device is configured to submit TO operations to the root logical volume using the first multipath driver via the first multipath device prior to the change in dependency of the host device and to submit IO operations to the root logical volume using the second multipath driver via the second multipath device after the change in dependency.

19. The computer program product of claim 17 wherein the first multipath device comprises a first plurality of paths to the root logical volume and the second multipath device comprises a second plurality of paths to a target root logical volume;
  wherein changing the dependency of the host device from the first multipath device to the second multipath device comprises changing the dependency of the host device from the root logical volume to the target root logical volume; and
  wherein the host device is configured to submit IO operations to the root logical volume using the first multipath device prior to the change in dependency of the host device and to submit IO operations to the target root logical volume using the second multipath device after the change in dependency of the host device.

20. The computer program product of claim 17 wherein the execution data comprises machine code for executing at least one operating system command;
  wherein the at least one operating system command comprises two or more of a suspend command, a reload command and a resume command;
  wherein suspending the root logical volume based at least in part on the execution data stored in the memory of the host device comprises executing the suspend command on the root logical volume based at least in part on the machine code for the suspend command stored in the memory of the host device; and
  wherein at least one of reloading the root logical volume and resuming the root logical volume comprises executing the respective reload or resume command on the root logical volume based at least in part on the machine code for the respective reload or resume command stored in the memory of the host device while the root logical volume is suspended due to the execution of the suspend command.

* * * * *